United States Patent
Sultenfuss et al.

(10) Patent No.: US 8,645,492 B2
(45) Date of Patent: Feb. 4, 2014

(54) SYSTEM AND METHOD FOR A WIRELESS DISPLAY LOW POWER MANAGED ADAPTER

(75) Inventors: Andrew T. Sultenfuss, Leander, TX (US); Bruce C. Montag, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 119 days.

(21) Appl. No.: 13/250,312

(22) Filed: Sep. 30, 2011

(65) Prior Publication Data

US 2013/0086206 A1 Apr. 4, 2013

(51) Int. Cl.
*G06F 15/16* (2006.01)
*H04N 7/18* (2006.01)
*H04N 9/64* (2006.01)
*G06F 3/038* (2013.01)

(52) U.S. Cl.
USPC .............. 709/217; 725/81; 348/571; 345/204

(58) Field of Classification Search
USPC ........................................................ 709/217
See application file for complete search history.

(56) References Cited

U.S. PATENT DOCUMENTS

| | | | | |
|---|---|---|---|---|
| 5,671,019 | A * | 9/1997 | Isoe et al. | 348/565 |
| 6,819,944 | B1 * | 11/2004 | Sato | 455/566 |
| 7,268,755 | B2 | 9/2007 | Selwan | |
| 7,899,941 | B2 * | 3/2011 | Hendry et al. | 710/1 |
| 2006/0183505 | A1 * | 8/2006 | Willrich | 455/566 |
| 2007/0103836 | A1 | 5/2007 | Oh | |
| 2007/0168763 | A1 | 7/2007 | Sauber et al. | |
| 2007/0188481 | A1 * | 8/2007 | Christison et al. | 345/204 |
| 2007/0230461 | A1 * | 10/2007 | Singh et al. | 370/389 |
| 2008/0034238 | A1 | 2/2008 | Hendry et al. | |
| 2008/0055318 | A1 * | 3/2008 | Glen | 345/501 |
| 2008/0297520 | A1 | 12/2008 | Montag | 345/501 |
| 2009/0089465 | A1 * | 4/2009 | Douglas et al. | 710/65 |
| 2009/0180755 | A1 * | 7/2009 | Kanemaru et al. | 386/84 |
| 2009/0193473 | A1 * | 7/2009 | Moon et al. | 725/81 |
| 2009/0322948 | A1 * | 12/2009 | Funabiki et al. | 348/571 |
| 2010/0082859 | A1 * | 4/2010 | Hendry et al. | 710/60 |
| 2010/0138748 | A1 * | 6/2010 | Sankararao et al. | 715/733 |
| 2011/0013548 | A1 | 1/2011 | Chen et al. | |
| 2011/0051638 | A1 | 3/2011 | Jeon et al. | |
| 2011/0126034 | A1 | 5/2011 | Siegel et al. | |
| 2011/0183704 | A1 | 7/2011 | Moreno et al. | |
| 2011/0199952 | A1 | 8/2011 | Seok | |
| 2011/0208984 | A1 | 8/2011 | Naware et al. | |
| 2012/0163181 | A1 * | 6/2012 | Xue et al. | 370/241 |
| 2012/0164961 | A1 * | 6/2012 | Gao et al. | 455/127.1 |
| 2013/0005353 | A1 * | 1/2013 | Traynor et al. | 455/456.1 |
| 2013/0028069 | A1 * | 1/2013 | Pelletier et al. | 370/216 |

\* cited by examiner

*Primary Examiner* — Brian P Whipple
*Assistant Examiner* — James Edwards
(74) *Attorney, Agent, or Firm* — Larson Newman, LLP

(57) ABSTRACT

A method for managing wireless data communication links includes establishing first and second wireless data communication links between a host system and a wireless display adapter. The first wireless data communication link is associated with a high data rate of data traffic between the host system and the wireless display adapter, and the second wireless data communication link is associated with a low data rate of data traffic. The method further includes determining that information is to be transmitted between the host system and the wireless display adapter using the low data rate, turning off a first data radio associated with the first wireless data communication link, and transmitting the information over the second wireless data communication link.

19 Claims, 5 Drawing Sheets

SYSTEM AND METHOD FOR A WIRELESS DISPLAY LOW POWER MANAGED ADAPTER

FIELD OF THE DISCLOSURE

The present disclosure generally relates to information handling systems, and more particularly relates to providing a wireless display low power managed adapter.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figure 1:
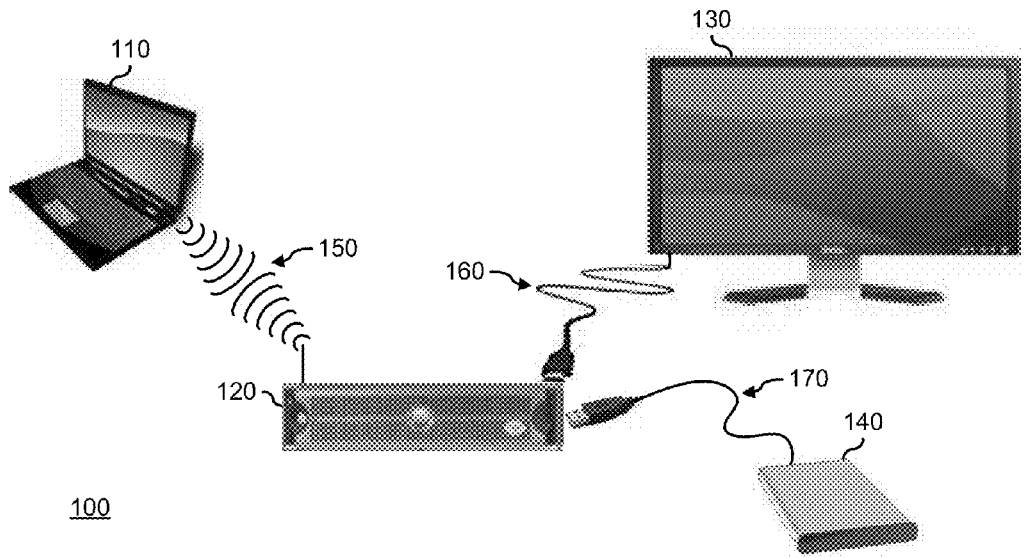
FIG. 1 is an illustration of a wireless display network according to an embodiment of the present disclosure.

FIG. 1 illustrates a wireless display network 100 that can include one or more information handling systems. For purposes of this disclosure, the information handling system may include any instrumentality or aggregate of instrumentalities operable to compute, classify, process, transmit, receive, store, retrieve, originate, switch, display, detect, record, reproduce, handle, or utilize any faun of information or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices, such as wired or wireless communications, various input and output (I/O) devices, such as a keyboard, a mouse, and a video display. The information handling system may also include one or more buses operable to transmit communications between the various hardware components.

In a particular embodiment, wireless display network 100 includes a wireless host system 110, a wireless display adapter 120, a display 130, and a storage device 140. Wireless host system 110 is connected to wireless display adapter 120 through a wireless data communication link 150, display 130 is connected to the wireless display adapter through a high definition audio/video cable 160, and storage device 140 is connected to the wireless display adapter through a high speed data cable 170. Wireless host system 110 is an information handling system that includes a wireless communication adapter and that can communicate data wirelessly to a device that is physically separated from the wireless host system, such as to wireless display adapter 120. For example, wireless host system 110 can include a desktop or laptop computer with a wireless adapter, a tablet computer, a web enabled cellular telephone such as a smart phone, another form factor of a mobile computing device, or a combination thereof.

Wireless host system 110 communicates with wireless display adapter 120 via wireless data communication link 150. As such, both wireless host system 110 and wireless display adapter 120 include one or more data communication radios adapted to transmit and receive data in accordance with various wireless data communication protocols for wireless local area networks (W-LANs) and personal area networks (PANs). The data communication radios can be in conformance with various standards for W-LANs and PANs that are created by various trade and industry related associations and interest groups such as the Institute for Electrical and Electronics Engineers (IEEE), the Bluetooth Special Interest Group, the International Society for Automation (ISA), or another association or special interest group. For example, the data communication radios can conform to one or more of IEEE 802.11a/b—54 Mbit/s, 5 GHz standard (1999), IEEE 802.11g—54 Mbit/s, 2.4 GHz standard (2003), IEEE 802.11n—Multiple input, multiple output antennas (MIMO) (2009), IEEE 802.11ac—Very High Throughput <6 GHz (Unpublished), IEEE 802.11ad: Very High Throughput 60 GHz (Unpublished), 802.15.4d—physical layer and media access control for low-rate wireless PANs (2009), Bluetooth Core Specification Version 4.0 (2010), or another wireless data communication standard. The data communication radios can also be in conformance with one or more proprietary standards for W-LANs and PANs.

Wireless host system 110 sends content information to wireless display adapter 120 to be displayed on display 130. In a particular embodiment, wireless host system 110 has a dual monitor capability, and establishes display 130 as a primary display or as a secondary display for the wireless host system when it is within range of wireless display adapter 120. In this case, a user of wireless host system 110 can interact with the content displayed on display 130 to manipulate the activities of the wireless host system. Here, user interface devices such as a keyboard and a mouse can be associated with wireless host system 110 or with wireless display adapter 120 to interact with the displayed content. Wireless host system 110 includes the ability to store and display high definition multimedia content such as Blue-ray Disks or High-Definition Digital Video Disks (HD DVDs), and display 130 includes the ability to display high definition audio and video content. As such, high definition audio/video cable 160 can include a high definition multimedia interface (HDMI) cable, a Display Port cable, a Cat5/Cat6 Ethernet cable using HDBaseT, or another high definition cable, or can include analog audio and video cables, or a combination thereof.

Wireless host system 110 also sends data to wireless display adapter 120 to be stored on storage device 140. Storage device 140 represents one or more storage devices such as disk drives, solid state storage devices, other storage devices, or a combination thereof As such, high speed data cable 170 can include a Universal Serial Bus (USB) interface or cable, an IEEE 1394 (FireWire) interface or cable, an Ethernet cable, a Peripheral Component Interconnect-Express (PCIe) interface or cable, or another data cable or connection. Wireless host system 110 also receives data from wireless display adapter 120. For example, wireless host system 110 can retrieve data from storage device 140, or can receive extended display identification data (EDID) from display 130.

In operation, wireless host system 110 establishes wireless data communication link 150 with wireless display adapter 120, receives EDID information from display 130, and determines the display capabilities of the wireless display adapter and the display. Wireless host system 110 can determine that a display refresh rate is low compared with the speed at which wireless data communication link 150 can be established, and can periodically send updated information to wireless display adapter 120 as needed or desired, and can turn off the wireless data communication link during intervals when the updated information is not being sent. Similarly, wireless host system 110 can determine that sending or retrieving data from storage device 140 only requires a short duration of data transmission over wireless data communication link 150, and can turn off the wireless data communication link during the intervals when no data is being stored or retrieved. In this way, the power consumption of wireless host system 110 is reduced as compared with a system that maintains a wireless data communication link when no data is being communicated.

In a particular embodiment, wireless host system 110 determines when the information displayed on display 130 is static, or nearly so, such as when no high definition multimedia content is being communicated, and when no inputs from user interface devices are being received that necessitate screen updates. For example, a graphical processing unit of wireless host system 110 can determine that no direct memory access is being made to a video display portion of a memory of the wireless host system. In response, wireless host system 110 can turn off wireless data communication link 150. In a particular embodiment, where wireless data communication link 150 represents links between multiple data communication radios, wireless host system 110 turns off all of the associated data communication radios. In another embodiment, wireless host system 110 turns off a subset of the data communication radios while leaving another subset of the data communication radios turned on, as needed or desired. Here for example, one or more data communication radios that host system 110 and wireless display adapter 120, and to handle small data transfers or low data rates, and one or more data communication radios that have a comparatively higher power consumption can be turned on to handle larger data transfers or higher data rates.

In a particular embodiment, when wireless host system 110 is a mobile device such as a laptop computer, a tablet computer, or a smart phone, the data communication radios can include a PAN. Here, when wireless host system 110 is brought within range of the PAN, a predefined setup between the wireless host system and wireless display adapter 120 is established. For example, upon detecting the presence of a known wireless host system 110, wireless display adapter 120 can initiate a partial power up of display 130, so that when the wireless host system sends information to be displayed on the display, the display is prepared to receive the display information. In this way, display 130 exhibits an instant-on capability, and a user of wireless host system 110 experiences little or no delay in viewing the content. The predefined setup can be stored in memories of wireless host system 110 and wireless display adapter 120, or can be stored in one and communicated to the other via the PAN or one or more of the other data communication radios. In another embodiment, wireless host system 110 is in a fixed or semi-fixed location, such as a desktop computer or a laptop computer that has not been recently moved, and the data communication radios include a PAN. Here, a mobile device that includes a data communication radio associated with the PAN can be brought within range of the PAN, and the predefined setup can be established as described above.

Figure 2:
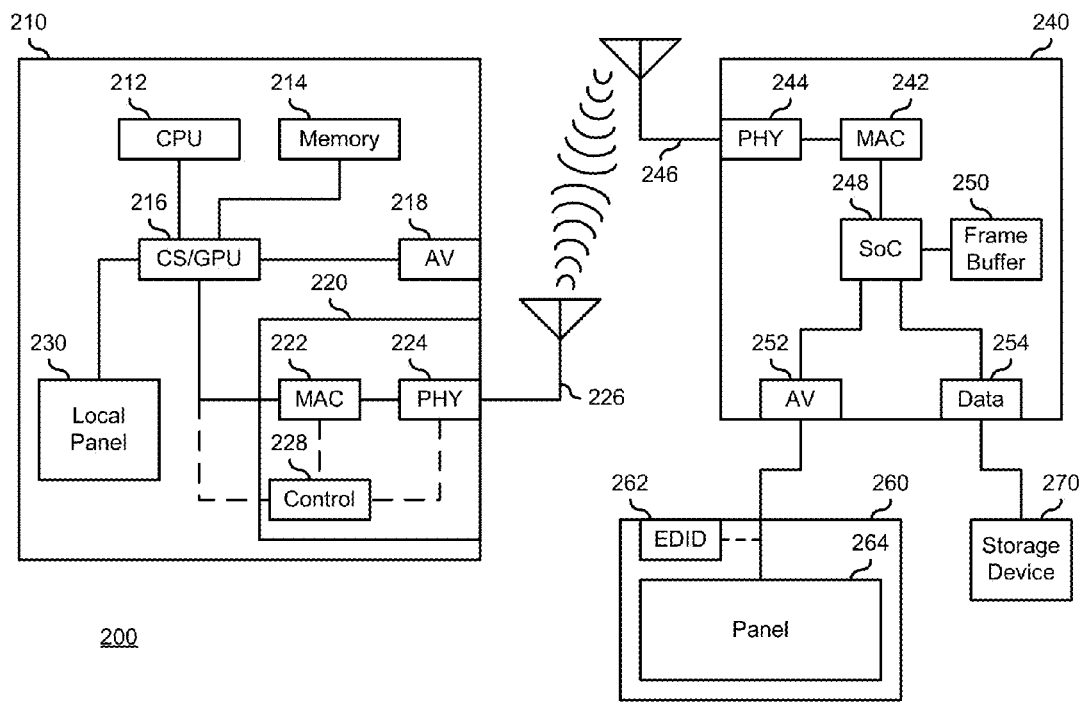
FIG. 2 is a block diagram illustrating a wireless display network similar to the wireless display network of FIG. 1, according to an embodiment of the present disclosure.

FIG. 2 illustrates another embodiment of a wireless display network 200, similar to wireless display network 100 and including a host system 210, a display adapter 240, a display 260, and a storage device 270. Host system 210 is connected to display adapter 240 via a wireless data communication link, display 240 is connected to the display adapter via a high definition cable, and storage device 270 is connected to the display adapter via a high speed data cable. Host system 210 includes a processor (CPU) 212, a memory 214, a chipset/graphics processing unit (CS/GPU) 216, a high definition audio/video connector (AV) 218, a wireless adapter 220, and a local display panel 230. CS/GPU 216 is connected to CPU 212, to memory 214, to AV 218, to wireless adapter 220, and to local display panel 230. Wireless adapter 220 includes a media access control (MAC) layer 222, a wireless physical (PHY) layer 224, an antenna 226, and a control module 228. MAC layer 222 is connected to CS/GPU 216 and to PHY layer 224, and the PHY layer is connected to antenna 226. Control module 228 is connected to CS/GPU 216, to MAC layer 222, and to PHY layer 224. PHY layer 224 includes data transmission hardware that provides the electrical interfaces, data handling procedures, and broadcast frequencies that define the wireless data communication link. In a particular embodiment, PHY layer 224 is in accordance with the IEEE 802.11ad specification, but PHY layer 224 can be in accordance with another wireless data communication standard, as needed or desired.

Display adapter 240 include a MAC layer 242, a PHY layer 244, an antenna 246, a system-on-a-chip (SoC) 248, a frame buffer 250, an AV connector 252, and a data connector 254. MAC layer 242 is connected to PHY layer 244, and the PHY layer is connected to antenna 246. SoC 248 is connected to MAC layer 242, to frame buffer 250, to AV 252, and to data connector 254. PHY layer 244 includes data transmission hardware that provides the electrical interfaces, data handling procedures, and broadcast frequencies that correspond to PHY layer 224. Display 260 includes a panel 264 and an EDID module 262 that are connected to AV 252.

In operation, CPU 212 executes code out of memory 214 to perform the various functions of host system 210. A graphical processor portion of CS/GPU 216 operates to receive display information in a form that is suitable for storage by memory 214 and manipulation by CPU 212, and to convert the display information into one or more of several formats that are suitable to be provided to various display interfaces. For example, host system 210 can include information related to one or more screen resolutions that are supported by local display panel 230, and CS/GPU 216 can convert display information into one of the supported screen resolutions and send the information to the local display panel. In another example, host system 210 can be connected to an external display via AV 218. If the external display does not have an ability to provide information related to one or more screen resolutions that are supported by the external display, then CS/GPU 216 can be set manually by a user of host system 210, or can be automatically set and a user can provide feedback as to whether the selected screen resolution is suitable. If the external display has the ability to provide information related to one or more screen resolutions that are supported by the external display, such as by providing EDID information, then CS/GPU 216 can automatically select a screen resolution. In another example, CS/GPU 216 can provide information over a data connection such as a PCIe data connection to MAC layer 222, and the MAC layer can format the information in a format that is suitable to be communicated by PHY layer 224 and antenna 226 to display adapter 240.

A chipset portion of CS/GPU 216 operates to manage and direct the I/O activities of host system 210, including providing for the control of wireless adapter 220. In the illustrated embodiment, control module 228 is connected to CS/GPU 216, and the CS/GPU provides control signals to the control module to implement the control functions described below. In another embodiment, the control functions of control module 228 are accessed as a portion of control registers implemented in MAC layer 222, and CS/GPU 216 accesses the functions of the control module through the same data connection as is used by the MAC layer.

Display adapter 240 operates to receive information from host system 210 via antenna 246 and PHY layer 244. PHY layer 244 provides the information to MAC layer 242 that reformats the information for SoC 248. SoC 248 includes functionality similar to CPU 212 and CS/GPU 216. SoC 248 determines if the received information is data that is targeted to storage device 270, or is display information that is targeted to display 260. If the received information is display information, then SoC 248 provides the information to display 260 to be displayed on panel 264. In addition, SoC 248 can store the display information in frame buffer 250. In this way, when the display information is static, or nearly so, display adapter 240 provides a frame refresh function to display 260 out of frame buffer 240, so that the need to receive frame refresh information from host system 210 is reduced. SoC 248 also receives EDID information from EDID module 262, and sends the EDID information to host system 210. In a particular embodiment, SoC 248 includes an ability to turn off and turn on PHY layer 244, either directly or through a control register of MAC layer 242, as described above.

In a particular embodiment, host system 210 determines when the information to be displayed on display 260 is static, or nearly so, and when no information is being transferred to or from storage device 270. In response, CS/GPU 216 directs control module 228 to turn off PHY layer 224. In another embodiment, CS/GPU 216 writes information to a control register in MAC layer 222 and the MAC layer turns off PHY layer 224. When host system 210 determines that the information to be displayed on display 260 needs to be updated, or that information is being transferred to or from storage device 270, CS/GPU 216 directs that PHY layer 224 be turned on, for example by one of the above embodiments, and the information is transferred between the host system and display adapter 240. In another embodiment, the data bandwidth of the wireless data communication link is very high, and that a turn-on latency of the wireless data communication link is very low. Here, host system 210 determines that the frame rate on display 260 is very low in comparison to the data bandwidth and the turn on latency, and CS/GPU 216 can provide one or more frames of information in a burst to MAC layer 222, for communication by PHY layer 224 to display adapter 240, and then the PHY layer can be turned off until it is time to send another burst of one or more frames. In another example, PHY layer 224 can be turned off after sending one or more lines of a frame.

In a particular embodiment, PHY layer 224 is turned off in a manner that completely disables the wireless data communication link between host system 210 and display adapter 240. In this case, when PHY layer 224 is subsequently powered on, MAC layer 222 and MAC layer 242 will renegotiate the establishment of the wireless data communication link, including performing any handshaking, negotiating of capabilities, data exchanges to establish control settings, and other processes as needed or desired to reestablish the wireless data communication link. In another embodiment, MAC layer 222 and MAC layer 242 include a stand-by state where each MAC layer retains the state information associated with the wireless data communication link to the other MAC layer. In this way, a small data packet can be transferred between host system 210 and display adapter 240 that resumes the wireless data communication link from the stand-by state to an active state, thereby reducing the time needed to turn on PHY layer 224 and PHY layer 244. In another embodiment, the entry into the stand-by state can be facilitated by the transfer of another small data packet the indicates that both PHY layer 222 and PHY layer 242 are to be shut down, and that both MAC layer 222 and MAC layer 242 are to enter the stand-by state.

Figure 3:
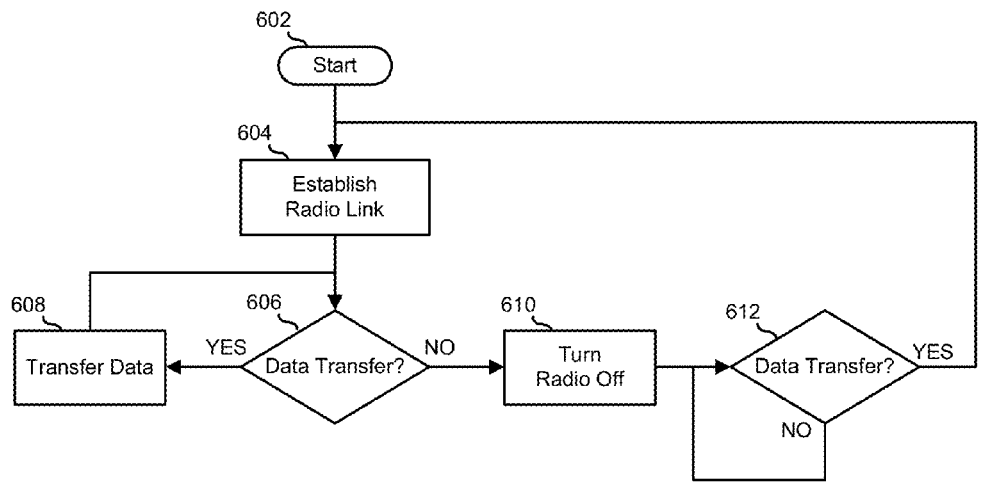
FIG. 3 is a flowchart illustrating a method for implementing the wireless display network of FIG. 2.

FIG. 3 illustrates a method for implementing a wireless display network similar to wireless display network 200, starting at block 602. A radio link is established in block 604. For example, PHY layer 224 and PHY layer 244 can be turned on and MAC layer 222 can associate with MAC layer 242, in order to establish a wireless data communication link between host system 210 and display adapter 240. A decision is made as to whether or not there is data to be transferred over the radio in decision block 606. If so, the YES branch of decision block 606 is taken, the data is transferred in block 608, and the method loops back to decision block 606 until the data transfer is complete. If there is no data to be transferred over the radio, the NO branch of decision block 606 is taken, and the radio is turned off in block 610. For example, PHY layer 224 and PHY layer 244 can be turned off. Here, the state information associated with the wireless data communication link can be retained or can be lost when PHY layer 224 and PHY layer 244 are turned off. A decision is made as to whether or not there is data to be transferred over the radio in decision block 612. In not, the NO branch of decision block 612 is taken and the method loops back to decision block 612 until there is a data transfer to process. If there is data to be transferred over the radio, the YES branch of decision block 606 is taken, and the method returns to block 604, where the radio link is established.

Figure 4:
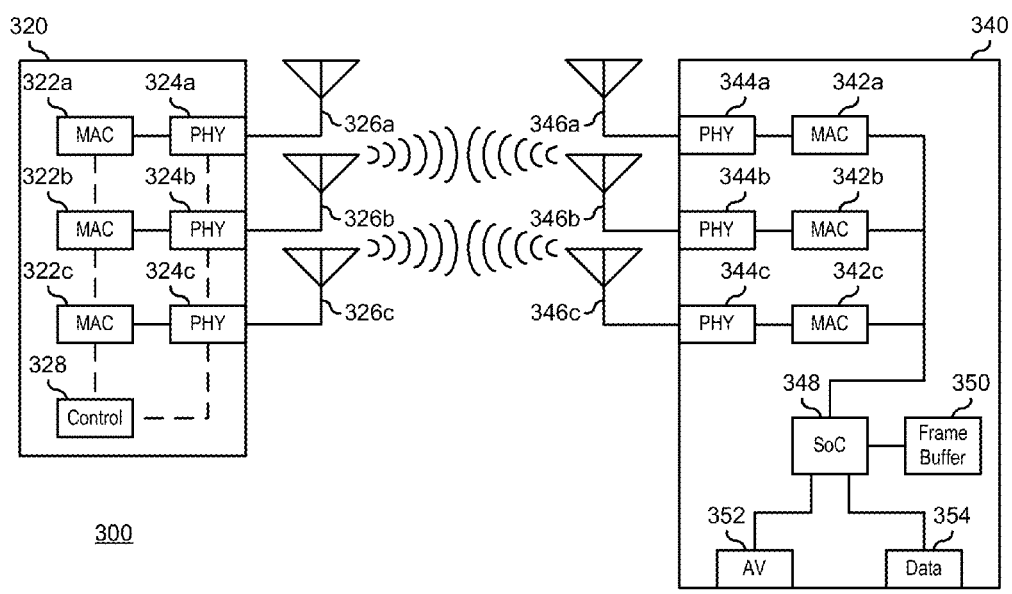
FIG. 4 is a block diagram illustrating another embodiment of a wireless display network similar to the wireless display networks of FIGS. 1 and 2.

FIG. 4 illustrates another embodiment of a wireless display network 300, similar to wireless display networks 100 and 200, and including a wireless adapter 320 and a display adapter 340. Wireless adapter 320 is connected to a host system similar to host system 210, and includes MAC layers 322a, 322b, and 322c, wireless PHY layers 324a, 324b, and 324c, antennas 326a, 326b, and 326c, and a control module 328. Each MAC layer 322a-c is connected to a respective PHY layer 324a-c, and each PHY layer is connected to a respective antenna 326a-c. Control module 328 is connected to MAC layers 322a-c, and to PHY layers 324a-c. Display adapter 340 includes MAC layers 342a, 342b, and 342c, PHY layers 344a, 344b, and 344c, antennas 346a, 346b, and 346c, a system-on-a-chip (SoC) 348, a frame buffer 350, an AV connector 352, and a data connector 354. Each MAC layer 342a-c is connected to a respective PHY layer 344a-c, and each PHY layer is connected to a respective antenna 346a-c. SoC 348 is connected to MAC layers 342a-c, to frame buffer 350, to AV 352, and to data connector 354. In a particular embodiment, PHY layer 324a and PHY layer 344a are in accordance with the IEEE 802.11ad specification, PHY layer 324b and PHY layer 344b are in accordance with the IEEE 802.11n specification, and PHY layer 324c and PHY layer 344c are in accordance with the IEEE 802.11a/b specification, however PHY layers 324a-c and PHY layers 344a-c can be in accordance with other wireless data communication standards, as needed or desired. In a particular embodiment, each of PHY layers 324a-c is associated with a common MAC layer, and each of PHY layers 344a-c is associated with a common MAC layer. In operation, wireless display network 300 operates similarly to wireless display network 200.

In a particular embodiment, the host system determines when the information to be displayed is nearly static and little information is being transferred to or from an external storage device connected to display adapter 340. In response, control module 328 turns off one or more of PHY layers 324a-c. For example, PHY layer 324c is illustrated as being turned off. Further, when the host system determines that the information to be displayed is static and no information is being transferred to or from the external storage device, control module 328 turns off all of PHY layers 324a-c.

Figure 5:
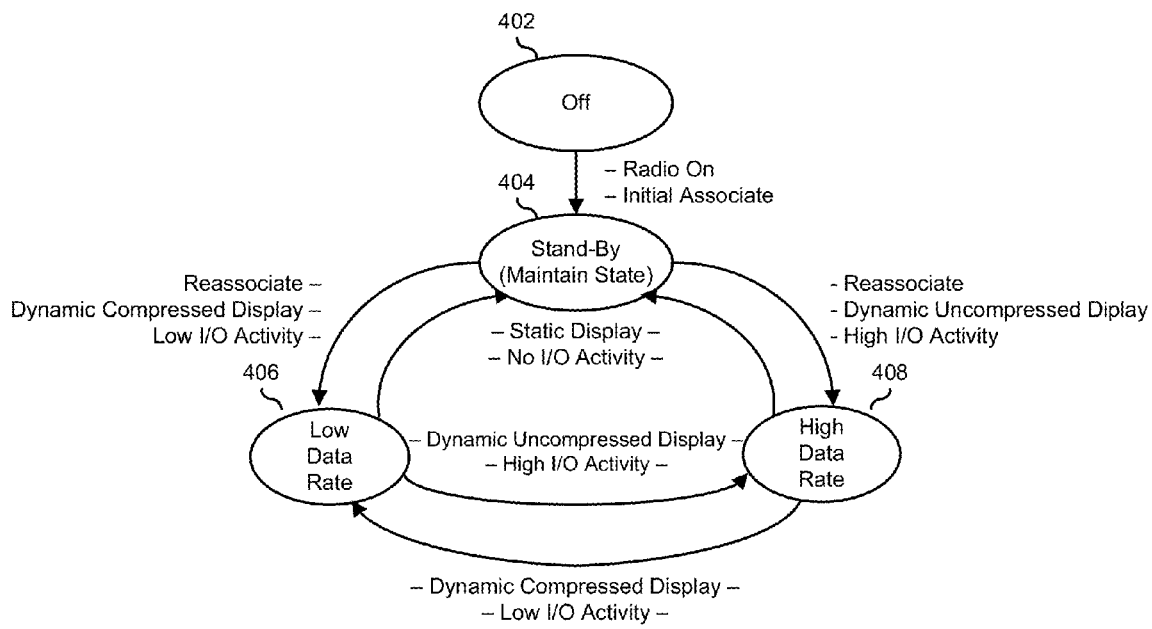
FIG. 5 is a state diagram illustrating operating modes implemented on the wireless display network of FIG. 4.

FIG. 5 illustrates a multi-mode operation implemented on wireless display network 300. Each of PHY layers 324a-c and PHY layers 344a-c can be turned off, and MAC layers 322a-c and MAC layers 342a-c have no state information related to the associated wireless data communication links. This represents an OFF mode, as illustrated by state 402. Each of PHY layers 324a-c and PHY layers 344a-c can also be turned off, but MAC layers 322a-c and MAC layers 342a-c can retain state information related to the associated wireless data communication links. This represents a stand-by mode, as illustrated by state 404. One or more, but not all, of PHY layers 324a-c and PHY layers 344a-c can be turned on, such that information can be transferred between wireless adapter 320 and display adapter 340, but where the information transfers do not benefit from the full available transfer bandwidth. This represents a LOW DATA RATE mode, as illustrated by state 406. Finally, all of PHY layers 324a-c and PHY layers 344a-c can be turned on, such that information transfers are performed at the full available transfer bandwidth. This represents a HIGH DATA RATE mode, as illustrated by state 408.

Here, wireless display network 300 begins in the OFF mode with all of PHY layers 324a-c and PHY layers 344a-c turned off, and MAC layers 322a-c and MAC layers 342a-c have no state information related to the associated wireless data communication links in state 402. When a request is generated either at wireless adapter 320 or at display adapter 340 to turn on one or more wireless data communication links, an initial association is done between the respective MAC layers 322a-c and MAC layers 342a-c, and wireless display network 300 enters the STAND-BY mode in state 404. If the display is static, or if there is no I/O activity over any of the wireless data communication links, then wireless display network 300 turns off PHY layers 324a-c and PHY layers 344a-c, and the wireless display network remains in the STAND-BY mode. From state 404, wireless display network 300 enters the LOW DATA RATE mode in state 406 when there is dynamic compressed display information or low rate I/O activity to be transferred between wireless adapter 320 and display adapter 340, a subset of PHY layers 324a-c and PHY layers 342a-c are turned on, and the respective MAC layers 322a-c and MAC layers 342a-c are reassociated. From state 404, wireless display network 300 enters the HIGH DATA RATE mode in state 408 when there is dynamic uncompressed display information or high rate I/O activity to be transferred between wireless adapter 320 and display adapter 340, all of PHY layers 324a-c and PHY layers 342a-c are turned on, and the respective MAC layers 322a-c and MAC layers 342a-c are reassociated.

From either state 406 or state 408, wireless display network 300 enters the STAND-BY mode in state 404 when the display is static, and there is no I/O activity over any of the wireless data communication links, and all of PHY layers 324a-c and PHY layers 342a-c are turned off. From state 406, wireless display network 300 enters the HIGH DATA RATE mode in state 408 when there is dynamic uncompressed display information or high rate I/O activity to be transferred between wireless adapter 320 and display adapter 340, and all remaining PHY layers 324a-c and PHY layers 342a-c are turned on. From state 408, wireless display network 300 enters the LOW DATA RATE mode in state 406 when there is dynamic compressed display information or low rate I/O activity to be transferred between wireless adapter 320 and display adapter 340, and a subset of PHY layers 324a-c and PHY layers 342a-c are turned off In another embodiment, wireless display network 300 turns on some or all of the wireless data communication links and performs the associations directly from state 402 to either state 406 or 408, based upon a determination that the LOW DATA RATE mode or the HIGH DATA RATE mode should be entered. It will be understood that the state diagram was described above with respect to wireless display network 300, but this is not necessarily so. The skilled artisan will recognize that additional states can be applied where different combinations of wireless data communication links are enabled to suit different power saving goals or data transfer rates. Moreover, the skilled artisan will recognize that different elements of wireless display network 300 can implement different state diagrams, as needed or desired. In another embodiment, in addition to the LOW DATA RATE and HIGH DATA RATE modes described above, one or more of PHY layers 324a-c can operate in two or more data rate modes, such as a high data rate and a low data rate for the particular PHY layer.

Figure 6:
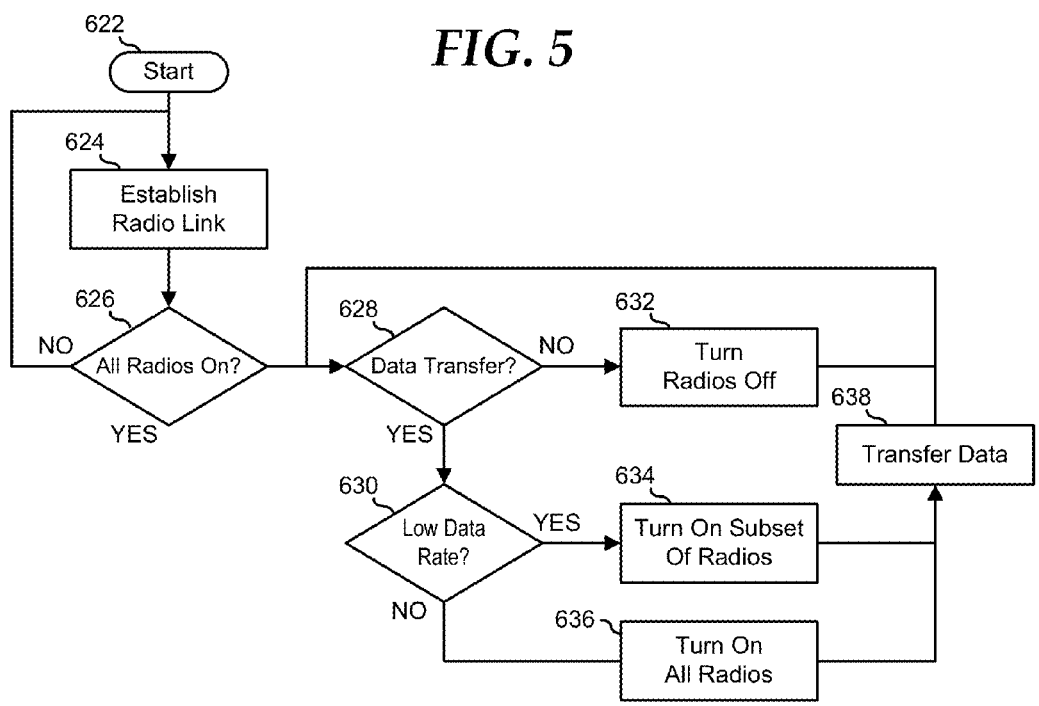
FIG. 6 is a flowchart illustrating a method for implementing the wireless display network of FIG. 4.

FIG. 6 illustrates a method for implementing a wireless display network similar to wireless display network 300, starting at block 622. A radio link is established in block 624. For example, PHY layer 324a and PHY layer 344a can be turned on and MAC layer 322a can associate with MAC layer 342a, in order to establish a wireless data communication link between wireless adapter 320 and display adapter 340. A decision is made as to whether or not all radios have been turned on in decision block 626. If not, the NO branch of decision block 626 is taken and the method returns to block 624 where another radio link is established. For example, when PHY layers 324a-c and PHY layers 344a-c are turned on and MAC layers 322a-c are associated with MAC layers 342a-c, wireless display network 300 can enter the STAND-BY mode. If all radios have been turned, the YES branch of decision block 626 is taken, and a decision is made as to whether or not there is data to be transferred over the radios in decision block 628. If not, the NO branch of decision block 628 is taken, the radios are turned off in block 632, and the method returns to decision block 628 to determine if there is data to be transferred over the radios. For example, wireless display network 300 can remain in the STAND-BY mode.

If there is data to be transferred over the radios, the YES branch of decision block 628 is taken and a decision is made as to whether or not the data is to be transferred using a low data rate in decision block 630. If so, the YES branch of decision block 630 is taken and a subset of the radios is turned on in block 634. For example, wireless display network 300 can enter the LOW DATA RATE mode. The data is transferred in block 638, and the method returns to decision block 628 where a decision is made as to whether or not there is still data to be transferred over the radios. If the data is not to be transferred using a low data rate, the NO branch of decision block 630 is taken and all of the radios are turned on in block 636. For example, wireless display network 300 can enter the HIGH DATA RATE mode. The data is transferred in block 638, and the method returns to decision block 628 where a decision is made as to whether or not there is still data to be transferred over the radios.

Figure 7:
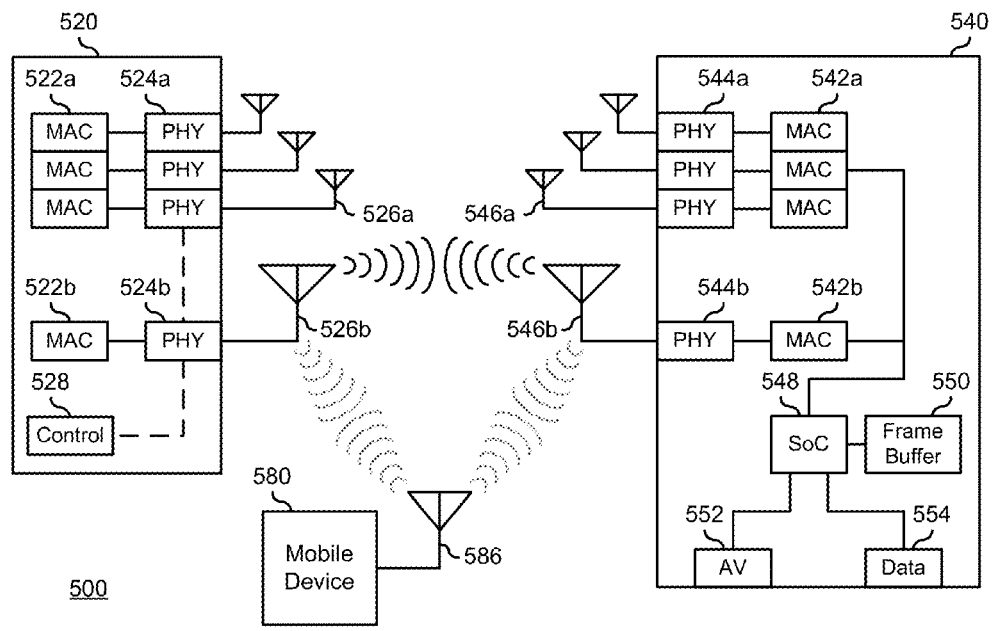
FIG. 7 is a block diagram illustrating another embodiment of a wireless display network similar to the wireless display networks of FIGS. 1, 2, and 4.

FIG. 7 illustrates another embodiment of a wireless display network 500, similar to wireless display networks 100, 200, and 300, and including a wireless adapter 520, a display adapter 540, and a mobile device 580. Wireless adapter 520 is connected to a host system similar to host system 210, and includes MAC layers 522a and 522b, wireless PHY layers 524a and 524b, antennas 526a and 526b, and a control module 528. Each MAC layer 522a-b is connected to a respective PHY layer 524a-b, and each PHY layer is connected to a respective antenna 526a-b. Control module 528 is connected to MAC layers 522a-b, and to PHY layers 524a-b. Display adapter 540 includes MAC layers 542a and 542b, PHY layers 544a and 544b, antennas 546a and 546b, a system-on-a-chip (SoC) 548, a frame buffer 550, an AV connector 552, and a data connector 554. Mobile device 580 includes a data communication radio 586.

Each MAC layer 542a-b is connected to a respective PHY layer 544a-b, and each PHY layer is connected to a respective antenna 546a-b. SoC 548 is connected to MAC layers 542a-b, to frame buffer 550, to AV 552, and to data connector 554. In a particular embodiment, PHY layer 524a and PHY layer 544a are similar to PHY layers 324a-c and PHY layers 344a-c described above. PHY layer 524b, PHY layer 544b, and data communication radio 586 may be in accordance with the Bluetooth Core Specification. However PHY layers 524a-b, PHY layers 544a-b, and data communication radio 586 can be in accordance with other wireless data communication standards, as needed or desired. In a particular embodiment, PHY layer 524a is associated with a common MAC layer, and PHY layer 544a is associated with a common MAC layer. In operation, wireless display network 500 operates similarly to wireless display network 300.

Here, when wireless adapter 520 is brought within range of the PHY layer 544b, a predefined setup between the wireless adapter and display adapter 540 is established. The predefined setup can be stored in a memory of the host system and display adapter 540, or can be stored in one and communicated to the other via the wireless data communication link between PHY layer 524b and PHY layer 544b. In another embodiment, wireless adapter 520 is in a fixed or semi-fixed location. Here, mobile device 580 can be brought within range of PHY layer 524b or PHY layer 544b, and the predefined setup can be established as described above.

Figure 8:
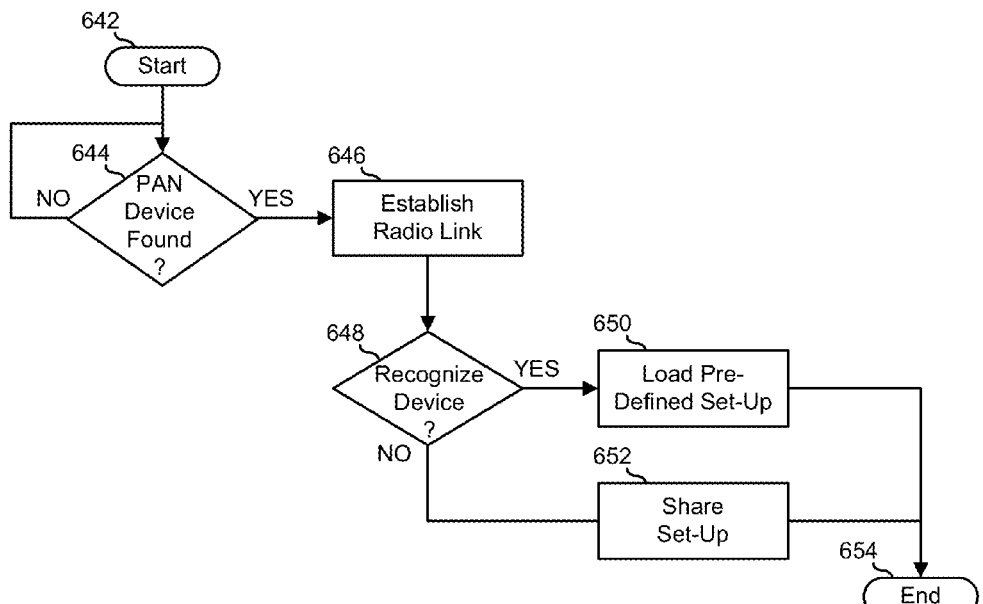
FIG. 8 is a flowchart illustrating a method for implementing the wireless display network of FIG. 7.

FIG. 8 illustrates a method for implementing a wireless display network similar to wireless display network 500, starting at block 642. A decision is made as to whether or not a PAN enabled device is found in decision block 644. If not, the NO branch of decision block 644 is taken and the method returns to decision block 644 until a PAN enable device is found. If a PAN enabled device is found, the YES branch of decision block 644 is taken and a radio link is established in block 646. For example, mobile device 580 can be brought within range of the PHY layer 544a. A decision is made as to whether or not the device is recognized in decision block 648. If so, the YES branch of decision block 648 is taken, a predefined set-up is loaded in block 650, and the method ends in block 654. For example, mobile device 580 can be recognized as having been associated with wireless display network 500, and one or both of wireless adapter 520 and display adapter 540 can provide a predefined set-up including associations for MAC layer 522a and MAC layer 542a. If the device is not recognized, the NO branch of decision block 648 is taken, a set-up is shared in Hock 652, and the method ends in block 654. For example, mobile device 580 can be unrecognized by either wireless adapter 520 or display adapter 540, and an association can be established such that the mobile device can cause the predefined set-up to happen on wireless display network 500.

Figure 9:
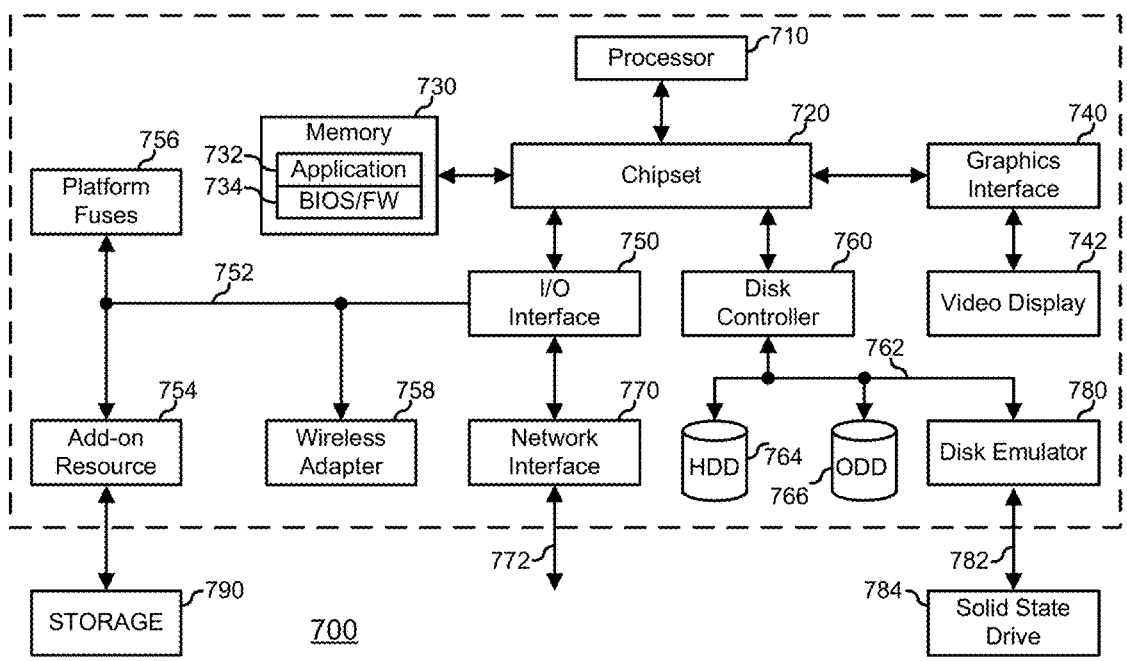
FIG. 9 is a block diagram illustrating an information handling system according to an embodiment of the present disclosure.

FIG. 9 is a block diagram illustrating an embodiment of an information handling system 700, including a processor 710, a chipset 720, a memory 730, a graphics interface 740, an input/output (I/O) interface 750, a disk controller 760, a network interface 770, and a disk emulator 780. In a particular embodiment, information handling system 700 is used to carry out one or more of the methods described herein. In another embodiment, one or more of the systems described herein are implemented in the form of information handling system 700.

Chipset 720 is connected to and supports processor 710, allowing the processor to execute machine-executable code.

In a particular embodiment (not illustrated), information handling system 700 includes one or more additional processors, and chipset 720 supports the multiple processors, allowing for simultaneous processing by each of the processors and permitting the exchange of information among the processors and the other elements of the information handling system. Chipset 720 can be connected to processor 710 via a unique channel, or via a bus that shares information among the processor, the chipset, and other elements of information handling system 700.

Memory 730 is connected to chipset 720. Memory 730 and chipset 720 can be connected via a unique channel, or via a bus that shares information among the chipset, the memory, and other elements of information handling system 700. In another embodiment (not illustrated), processor 710 is connected to memory 730 via a unique channel. In another embodiment (not illustrated), information handling system 700 includes separate memory dedicated to each of the one or more additional processors. A non-limiting example of memory 730 includes static random access memory (SRAM), dynamic random access memory (DRAM), non-volatile random access memory (NVRAM), read only memory (ROM), flash memory, another type of memory, or any combination thereof.

Graphics interface 740 is connected to chipset 720. Graphics interface 740 and chipset 720 can be connected via a unique channel, or via a bus that shares information among the chipset, the graphics interface, and other elements of information handling system 700. Graphics interface 740 is connected to a video display 742. Other graphics interfaces (not illustrated) can also be used in addition to graphics interface 740 as needed or desired. Video display 742 includes one or more types of video displays, such as a flat panel display, another type of display device, or any combination thereof.

I/O interface 750 is connected to chipset 720. I/O interface 750 and chipset 720 can be connected via a unique channel, or via a bus that shares information among the chipset, the I/O interface, and other elements of information handling system 700. Other I/O interfaces (not illustrated) can also be used in addition to I/O interface 750 as needed or desired. I/O interface 750 is connected via an I/O interface 752 to one or more add-on resources 754. Add-on resource 754 is connected to a storage system 790, and can also include another data storage system, a graphics interface, a network interface card (NIC), a sound/video processing card, another suitable add-on resource or any combination thereof I/O interface 750 is also connected via I/O interface 752 to one or more platform fuses 756 and to a wireless adapter 758. Platform fuses 756 function to set or modify the functionality of information handling system 700 in hardware. Wireless adapter 758 provides a radio communication channel to other wireless enabled devices.

Disk controller 760 is connected to chipset 720. Disk controller 760 and chipset 720 can be connected via a unique channel, or via a bus that shares information among the chipset, the disk controller, and other elements of information handling system 700. Other disk controllers (not illustrated) can also be used in addition to disk controller 760 as needed or desired. Disk controller 760 includes a disk interface 762. Disk controller 760 is connected to one or more disk drives via disk interface 762. Such disk drives include a hard disk drive (HDD) 764, and an optical disk drive (ODD) 766, and can include one or more disk drive as needed or desired. ODD 766 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 760 is connected to disk emulator 780. Disk emulator 780 permits a solid-state drive 784 to be coupled to information handling system 700 via an external interface 782. External interface 782 can include industry standard busses such as USB or IEEE 1394 (Firewire) or proprietary busses, or any combination thereof. Alternatively, solid-state drive 784 can be disposed within information handling system 700.

Network interface device 770 is connected to I/O interface 750. Network interface 770 and I/O interface 750 can be coupled via a unique channel, or via a bus that shares information among the I/O interface, the network interface, and other elements of information handling system 700. Other network interfaces (not illustrated) can also be used in addition to network interface 770 as needed or desired. Network interface 770 can be a network interface card (NIC) disposed within information handling system 700, on a main circuit board such as a baseboard, a motherboard, or any combination thereof, integrated onto another component such as chipset 720, in another suitable location, or any combination thereof. Network interface 770 includes a network channel 772 that provide interfaces between information handling system 700 and other devices (not illustrated) that are external to information handling system 700. Network interface 770 can also include additional network channels (not illustrated).

Information handling system 700 includes one or more application programs 732, and Basic Input/Output System and Firmware (BIOS/FW) code 734. BIOS/FW code 734 functions to initialize information handling system 700 on power up, to launch an operating system, and to manage input and output interactions between the operating system and the other elements of information handling system 700. In a particular embodiment, application programs 732 and BIOS/FW code 734 reside in memory 730, and include machine-executable code that is executed by processor 710 to perform various functions of information handling system 700. In another embodiment (not illustrated), application programs and BIOS/FW code reside in another storage medium of information handling system 700. For example, application programs and BIOS/FW code can reside in HDD 764, in a ROM (not illustrated) associated with information handling system 700, in an option-ROM (not illustrated) associated with various devices of information handling system 700, in storage system 790, in a storage system (not illustrated) associated with network channel 772, in another storage medium of information handling system 700, or a combination thereof. Application programs 732 and BIOS/FW code 734 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof Additional components of the information handling system can include one or more storage devices, one or more communications ports for communicating with external devices, as well as, various input and output (I/O) devices, such as a keyboard, a mouse, a video/graphic display, or any combination thereof The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
establishing a first wireless data communication link and a second wireless data communication link between a host system and a wireless display adapter, wherein the first wireless data communication link is associated with a first data rate of data traffic between the host system and the wireless display adapter, and the second wireless data communication link is associated with a second data rate of data traffic between the host system and the wireless display adapter, and wherein the first data rate is a higher data rate than the second data rate;
determining that first information is to be transmitted between the host system and the wireless display adapter using the second data rate;
turning off a first data radio associated with the first wireless data communication link in response to determining that the first information is to be transmitted using the second data rate;
initiating, by the wireless display adapter, a partial power up of a display; and
transmitting the first information over the second wireless data communication link.

2. The method of claim 1, further comprising:
determining that second information is to be transmitted between the host system and the wireless display adapter using the first data rate;
turning on the first data radio; and
transmitting the second information over the first wireless data communication link.

3. The method of claim 2, wherein:
the second information comprises frame data for a display associated with the wireless display adapter; and
the method further comprising turning off the first data radio after the second information is transmitted.

4. The method of claim 3, further comprising:
determining by the host system that frame data is static; and
wherein turning off the first data radio after the second information is transmitted is in response to determining that the frame data is static.

5. The method of claim 1, further comprising:
determining that no information is to be transmitted between the host system and the wireless display adapter; and
turning off a second data radio associated with the second wireless data communication link.

6. The method of claim 5, further comprising:
determining that second information is to be transmitted between the host system and the wireless display adapter using the second data rate;
turning on the second data radio; and
transmitting the second information over the second wireless data communication link.

7. The method of claim 1, wherein the second wireless data communication link comprises an IEEE 802.11 ad link.

8. The method of claim 1, further comprising:
retaining an association between the host system and the wireless display adapter for the first wireless data communication link in response to turning off the first data radio.

9. The method of claim 1, wherein the first wireless data communication link further provides a first data rate mode and a second data rate mode.

10. A method comprising:
establishing a wireless data communication link between a host system and a wireless display adapter, wherein the wireless display adapter is coupled to a display;
determining whether first information is to be transmitted over the wireless data communication link;
transferring the first information over the wireless data communication link in response to determining that the first information is to be transmitted over the wireless data communication link;
turning off the wireless data communication link in response to determining that the first information is not to be transmitted over the wireless data communication link;
determining whether second information is to be transmitted over the wireless data communication link;

transferring the second information over the wireless data communication link in response to determining that the second information is to be transmitted over the wireless data communication link;

turning off the wireless data communication link in response to transferring the second information; and initiating, by the wireless display adapter, a partial power up of the display;

wherein the first information comprises less than a full frame of data for the display.

11. The method of claim 10, comprising:

determining whether second information is to be transmitted over the wireless data communication link;

transferring the second information over the wireless data communication link in response to determining that the second information is to be transmitted over the wireless data communication link; and turning off the wireless data communication link in response to transferring the second information.

12. The method of claim 10, wherein:

the method further comprising determining by the host system that frame data is static; and wherein further, turning off the wireless data communication link is in response to determining that the frame data is static.

13. The method of claim 10, wherein the wireless data communication link comprises an IEEE 802.11 ad link.

14. The method of claim 10, further comprising:

retaining an association between the host system and the wireless display adapter for the wireless data communication link in response to turning off the wireless data communication link.

15. A method comprising:

establishing a first wireless data communication link between a host system and a mobile device;

retrieving, from the mobile device, a predefined set-up over the first wireless data communication link, wherein the predefined set-up defines a set-up parameter for a second wireless data communication link between the host system and a wireless display adapter, and wherein the wireless display adapter is separate from the mobile device;

applying the predefined set-up to the second wireless data communication link in response to retrieving the predefined set-up;

establishing the second wireless data communication link between the host system and the wireless display adapter in response to applying the predefined set-up;

detecting, by the wireless display adapter, that the mobile device is present; and initiating, a partial power up of a display in response to detecting that the mobile device is present.

16. The method of claim 15, wherein retrieving the predefined set-up is in response to determining that the mobile device is a recognized device.

17. The method of claim 15, wherein the first wireless data communication link comprises a personal area network (PAN) link, and the second wireless data communication link comprises a wireless local area network (W-LAN) link.

18. The method of claim 17, wherein the PAN link comprises a Bluetooth link.

19. The method of claim 17, wherein the W-LAN link comprises an IEEE 802.11 ad link.

* * * * *